("""（12）United States Patent
Laine et al.

(10) Patent No.: US 10,712,242 B2
(45) Date of Patent: Jul. 14, 2020

(54) MERCURY-IN-GAS SAMPLING SYSTEM

(71) Applicant: Process HG GROUP HOLDINGS, LLC, Houston, TX (US)

(72) Inventors: Patrick L. Laine, Pearland, TX (US); James H. Vickery, Jr., Pearland, TX (US); Jason Lee Buhlman, Houston, TX (US)

(73) Assignee: PROCESS HG GROUP HOLDINGS, LLC, Houston, TX (US)

( * ) Notice: Subject to any disclaimer, the term of this patent is extended or adjusted under 35 U.S.C. 154(b) by 380 days.

(21) Appl. No.: 15/873,990

(22) Filed: Jan. 18, 2018

(65) Prior Publication Data

US 2018/0246015 A1   Aug. 30, 2018

Related U.S. Application Data

(60) Provisional application No. 62/464,499, filed on Feb. 28, 2017.

(51) Int. Cl.
G01N 1/22 (2006.01)
G01N 30/30 (2006.01)
G01N 30/32 (2006.01)
G01N 30/02 (2006.01)

(52) U.S. Cl.
CPC ......... *G01N 1/2214* (2013.01); *G01N 1/2247* (2013.01); *G01N 1/2294* (2013.01); *G01N 30/30* (2013.01); *G01N 30/32* (2013.01); *G01N 2030/025* (2013.01)

(58) Field of Classification Search
CPC ............... G01N 1/2214; G01N 2001/2217
See application file for complete search history.

(56) References Cited

U.S. PATENT DOCUMENTS

| 5,653,884 | A | * | 8/1997 | Smart ............... B01D 11/0203 210/175 |
| 6,475,802 | B2 | | 11/2002 | Schaedlich et al. |
| 6,675,629 | B2 | | 1/2004 | Aldridge et al. |
| 7,037,725 | B2 | | 5/2006 | Mandel et al. |
| 7,354,553 | B2 | | 4/2008 | Appel et al. |
| 7,454,945 | B1 | | 11/2008 | Kita et al. |

(Continued)

FOREIGN PATENT DOCUMENTS

GB   2433122 A   6/2007

OTHER PUBLICATIONS

Vickery, Jr., James H. Mercury Management White Paper 2012, "The Measurement and Monitoring of Mercury in Natural Gas with Sorbent Traps." Copyright 2012 Portnoy Environmental, Inc. PEI-FGS Feb. 2012.

(Continued)

*Primary Examiner* — Herbert K Roberts
(74) *Attorney, Agent, or Firm* — Carlson, Gaskey & Olds, P.C.

(57) ABSTRACT

A system according to an exemplary aspect of the present disclosure includes a probe configured to collect a sample gas stream, a pressure reduction section, a heated sorbent trap section, and a control loop. The pressure reduction section has a critical orifice and a heater configured to heat the critical orifice. The heated sorbent trap section is configured to receive a first portion of the sample gas stream, and the control loop is configured to receive a second portion of the sample gas stream.

14 Claims, 2 Drawing Sheets

(56) References Cited

U.S. PATENT DOCUMENTS

| | | | |
|---|---|---|---|
| 7,454,952 B2 | 11/2008 | Kita et al. | |
| 2001/0014478 A1* | 8/2001 | Schaedlich | G01N 33/0045 |
| | | | 436/81 |
| 2006/0243096 A1 | 11/2006 | Kita et al. | |
| 2008/0047370 A1 | 2/2008 | Vickery, Jr. | |
| 2011/0285998 A1* | 11/2011 | Hara | G01N 21/3504 |
| | | | 356/437 |

OTHER PUBLICATIONS

Waters, Tony. Industrial Sampling Systems; Reliable Design & Maintentance for Process Analyzers. , Chapter 6—Controlling Sample Flow pp. 256-258, Chapter 7—Controlling Sample Pressure pp. 321-322. Copyright 2013, Swagelok Company.

Knight, Jeremy. Drawing referencing U.S. Appl. No. 13/858,056 and GB Patent No. 2433122. EnDet Ltd. VE Technology. VEHg Trap Sampling System Annotated Sales Drawing—Rev1, Drawing No. ED05 0018 015. Aug. 1, 2013.

Ashok. Drawing referencing U.S. Appl. No. 13/858,056 and GB Patent No. 2433122 and U.S. Pat. No. 8,624,396. EnDet Ltd. VE Technology. VEHg Trap Sampling System Process Schematic. Drawing No. Ed05 0018 19. Orbital Global Solutions, VE Technology & EnDet Ltd. Apr. 1, 2014.

Orbital Gas Systems, VE Technology. VE Conditioning Unit (VECU), Technical Data Sheet. VECU Patent No. GB 2433122B. TDS 001 Issue 7.

Orbital Global Solutions. VE Techology. Integrated Sampling Solutions. Downloaded from http://orbitalgas.com/wp-content/uploads/2016/12/VE_Sampling.pdf, Dec. 1, 2016.

* cited by examiner

MERCURY-IN-GAS SAMPLING SYSTEM

RELATED APPLICATIONS

This application claims the benefit of U.S. Provisional Application No. 62/464,499, filed Feb. 28, 2017, the entirety of which is herein incorporated by reference.

BACKGROUND

This disclosure relates to a system for testing mercury levels in gas, such as high pressure natural gas.

Mercury occurs naturally in geological hydrocarbons such as oil and gas, but the concentrations of mercury vary. High concentrations of mercury in gas can accumulate in processing equipment, which may increase exposure risk for those around the equipment. In some applications, such as natural gas pipes, the gas is sampled in order to report mercury concentrations.

Known mercury sampling systems use a sorbent trap to collect samples for testing, but in order to test the sample, the pressure of the gas needs to be reduced to accommodate the maximum operating pressure of the sorbent trap sampling system components. Such mercury sampling systems generally include a diaphragm regulator to reduce pressure upstream of a sorbent trap.

SUMMARY

A system according to an exemplary aspect of the present disclosure includes a probe configured to collect a sample gas stream, a pressure reduction section, a heated sorbent trap section, and a control loop. The pressure reduction section has a critical orifice and a heater configured to heat the critical orifice. The heated sorbent trap section is configured to receive a first portion of the sample gas stream, and the control loop is configured to receive a second portion of the sample gas stream.

In a further non-limiting embodiment of any of the foregoing systems, the sorbent trap section is arranged in parallel to the control loop such that the first portion of the sample gas stream does not flow through the control loop.

In a further non-limiting embodiment of any of the foregoing systems, the heater directly contacts the critical orifice.

In a further non-limiting embodiment of any of the foregoing systems, a second heater is configured to heat the sorbent trap section.

In a further non-limiting embodiment of any of the foregoing systems, a pressure of the sample gas stream upstream of the critical orifice is between 200 and 1500 psi, and a second pressure of the sample gas stream downstream of the critical orifice is between 5 and 10 psig.

In a further non-limiting embodiment of any of the foregoing systems, the critical orifice is the only pressure control means for the first portion of the sample gas stream.

In a further non-limiting embodiment of any of the foregoing systems, the critical orifice contains titanium.

In a further non-limiting embodiment of any of the foregoing systems, the heated sorbent trap section comprises a sorbent trap manifold and at least one sorbent trap in a sorbent trap enclosure.

In a further non-limiting embodiment of any of the foregoing systems, the at least one sorbent trap includes at least one of a gold trap and a carbon trap.

In a further non-limiting embodiment of any of the foregoing systems, the control loop comprises a back pressure regulator.

In a further non-limiting embodiment of any of the foregoing systems, the control loop comprises a pressure check valve, a pressure gauge, and a thermometer.

In a further non-limiting embodiment of any of the foregoing systems, comprising a metering section configured to communicate the sample gas stream to a vent header.

In a further non-limiting embodiment of any of the foregoing systems, the metering section comprises a flow meter, a pressure gauge, and a thermometer.

In a further non-limiting embodiment of any of the foregoing systems, the metering section comprises a check valve.

A method according to an exemplary aspect of the present disclosure includes collecting a sample gas stream, communicating the sample gas stream through a critical orifice, and heating the critical orifice with a heater.

In a further non-limiting embodiment of the foregoing method, comprising communicating a first portion of the sample gas stream to a heated sorbent trap section and communicating a second portion of the sample gas stream to a control loop.

In a further non-limiting embodiment of the foregoing method, the heated sorbent trap section is arranged in a parallel configuration with the control loop.

In a further non-limiting embodiment of the foregoing method, comprising communicating the first and second portions of the sample gas stream to a metering section downstream of the heated sorbent trap section and the control loop.

In a further non-limiting embodiment of the foregoing method, the control loop comprises a back pressure regulator configured to finely control the pressure of the sample gas stream.

In a further non-limiting embodiment of the foregoing method, comprising maintaining a temperature of the sample gas stream above a dew point for all components in the gas stream.

BRIEF DESCRIPTION OF THE DRAWINGS

The drawings can be briefly described as follows.

DETAILED DESCRIPTION

Figure 1:
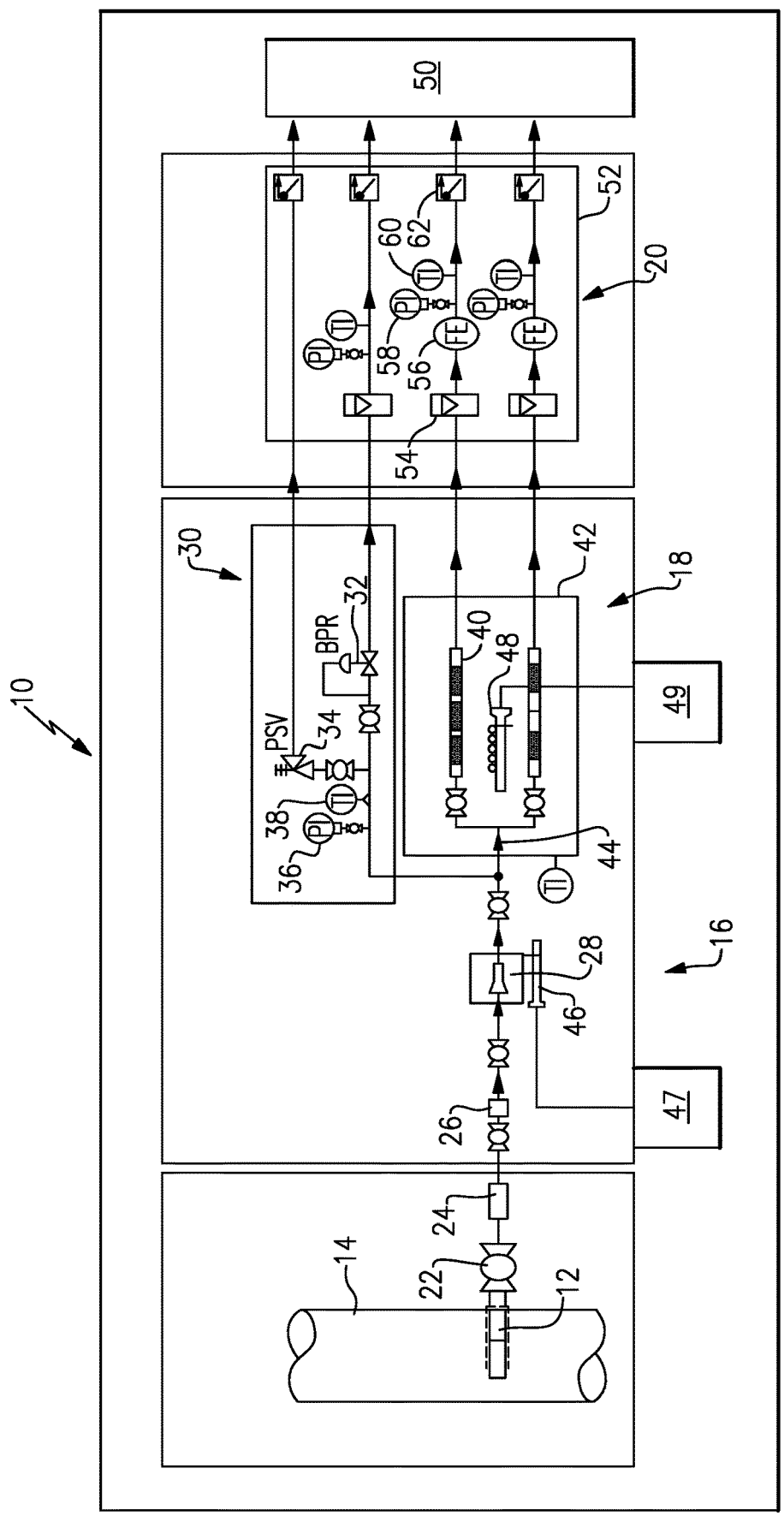
FIG. 1 schematically illustrates a first system according to this disclosure.

FIG. 1 schematically illustrates an example mercury-in-gas ("MIG") sampling system 10. A probe 12 taps into a gas pipe 14 and directs a sample gas stream to the MIG sampling system 10. The system 10 includes a pressure reduction section 16, a pressure, flow, speed loop section 30, a sorbent trap section 18, and a metering section 20. In some examples, the gas pipe 14 contains natural gas. Further, the gas in the pipe 14 may have a pressure between 200 and 1500 pounds per square inch (psi), for example.

In the example of FIG. 1, one or more isolation valves 22 are located downstream of the probe 12 and upstream of the pressure reduction section 16. The system 10 includes a sample supply line and may optionally include heat tracing 24 or some other similar pipe heating device. An inlet filter 26 may be located downstream of the probe 12. In some embodiments, the inlet filter 26 is an inlet micron particulate filter.

The pressure reduction system 16 reduces the high pressure of the gas in the sample gas stream to a safe level for testing. The example pressure reduction system 16 uses a critical orifice 28 to decrease the pressure in the sample gas stream. The pressure difference in the gas upstream and downstream of the critical orifice 28 causes choked flow, which means the gas will have a constant flow velocity. The size of the critical orifice 28 and the pressure of the gas upstream of the critical orifice 28 determine the flow rate of the gas downstream of the critical orifice 28. Thus, the diameter of the critical orifice 28 is selected based upon a particular application. In some embodiments, the pressure of the sample gas stream should be maintained at 5-10 psig (pounds per square inch gauge) to accommodate the use of sorbent traps and to maintain the temperature of the sample gas stream above the dew-point of all components in the sample gas stream. In one embodiment, the critical orifice 28 is the only pressure control component in the sorbent trap sample flow path. In one example, the critical orifice 28 is constructed entirely of titanium. In other example, the critical orifice 28 contains titanium.

The use of a critical orifice 28 instead of a diaphragm regulator may reduce the potential accumulation of contamination in the sample gas, while still delivering an equal and consistent sample stream. A diaphragm regulator in some situations can become contaminated over time with buildup of dirt, dust, mercury, and other contaminants, and diaphragm regulators are often difficult to clean. A critical orifice 28 is a much simpler configuration, which is easier to clean and cheaper to replace should it become contaminated.

The sample gas stream is split downstream of the critical orifice 28. A first portion of the gas stream flows through a pressure, flow, speed loop section 30, while a second portion of the gas stream flows through the sorbent trap section 18. The pressure, flow, speed loop section 30 includes a back pressure regulator (or, BPR) 32, which allows for fine control of gas in the system 10. The loop section 30 is arranged in a parallel configuration with the sorbent trap section 18, such that gas flowing through the loop section 30 will not also flow through the sorbent trap section 18. The loop section 30 may also include an adjustable cracking pressure check valve 34, one or more pressure gauges 36, and one or more thermometers 38. In an embodiment, the pressure gauge 36 is a liquid filled pressure gauge. In an embodiment, the thermometer 38 is a gas actuated thermometer.

The second portion of the gas stream, which does not flow through the pressure, flow, speed loop section 30, flows to the sorbent trap section 18. The sorbent trap section 18 contains at least one sorbent trap 40 in a sorbent trap enclosure 42 during the active sampling phase. The sorbent trap enclosure 42 provides sorbent trap structural support and provides convenient installation and removal of sorbent traps 40. The sorbent traps 40 extract and trap mercury from the gas sample. In an embodiment, the sorbent traps 40 are gold traps. In another embodiment, the sorbent traps 40 are carbon traps. In a further embodiment, the sorbent trap section 18 contains both gold traps and carbon traps. A sorbent trap manifold 44 provides for consistent temperature, pressure, and flow rate of the gas sample stream as it is delivered to the sorbent traps 40. In an embodiment, the sorbent trap manifold 44 includes inter-connecting tubing.

In order to improve the effectiveness of the sorbent traps 40, the gas sample is heated. Heating the gas sample causes thermal desorption, which increases the volatility of contaminants such that they can be separated from the gas. In the system 10, heat is applied directly to the critical orifice 28 using a heater 46. In one embodiment, the heater 46 directly contacts an outer surface of the critical orifice 28. In another embodiment, there is an intermediate thermal insulation material between the exterior surface of the heater 46 and the critical orifice 28. The system 10 minimizes cooling due to the Joule-Thomson effect by applying heat directly to the critical orifice 28, which is where a pressure drop occurs. A heater control 47 may control the heater 46.

In an embodiment, the enclosure 42 containing the sorbent traps 40 is insulated. In a further embodiment, the enclosure 42 contains an enclosure heater 48. A heater control 49 may control the heater 46.

Allowing a portion of the sample stream to travel through the pressure, flow, speed loop section 30 and another portion of the sample stream travel through the sorbent trap section 18 helps reduce contamination in the portion of the sample stream going to the sorbent trap section 18. Some of the control loop components, such as the back pressure regulator 32 may have a buildup of contaminants over time. Additional components, such as the tubing, valves, filters, and regulators may also have contamination. The portion of the sample gas stream that is exposed to possible contaminants in the loop section 30 never travels through the sorbent trap section 18. By locating the control loop components out of the sample-to-sorbent trap pathway, the potential for residual mercury contamination to reach the sorbent trap 40, thereby distorting the sample, is reduced significantly.

After flowing through either the loop section 30 or the sorbent trap section 18, the sample gas stream flows through the metering section 20, and out to the vent header 50. The metering section 20 takes an accurate volumetric measure of the sample gas stream that passed through each of the sorbent traps 40. The metering section 20 may be enclosed in an enclosure 52. The metering section 20 may use inter-connecting tubing. The metering section 20 may include a flow meter 54, dry gas volume meter 56, pressure gauge 58, thermometer 60, and/or check valve 62. The flow meter 54 may include a rotameter with a micro flow rate needle valve. The thermometer 60 may be an analog thermometer with a thermowell type sensor. The check valve 62 may be a low cracking pressure check valve.

Figure 2:
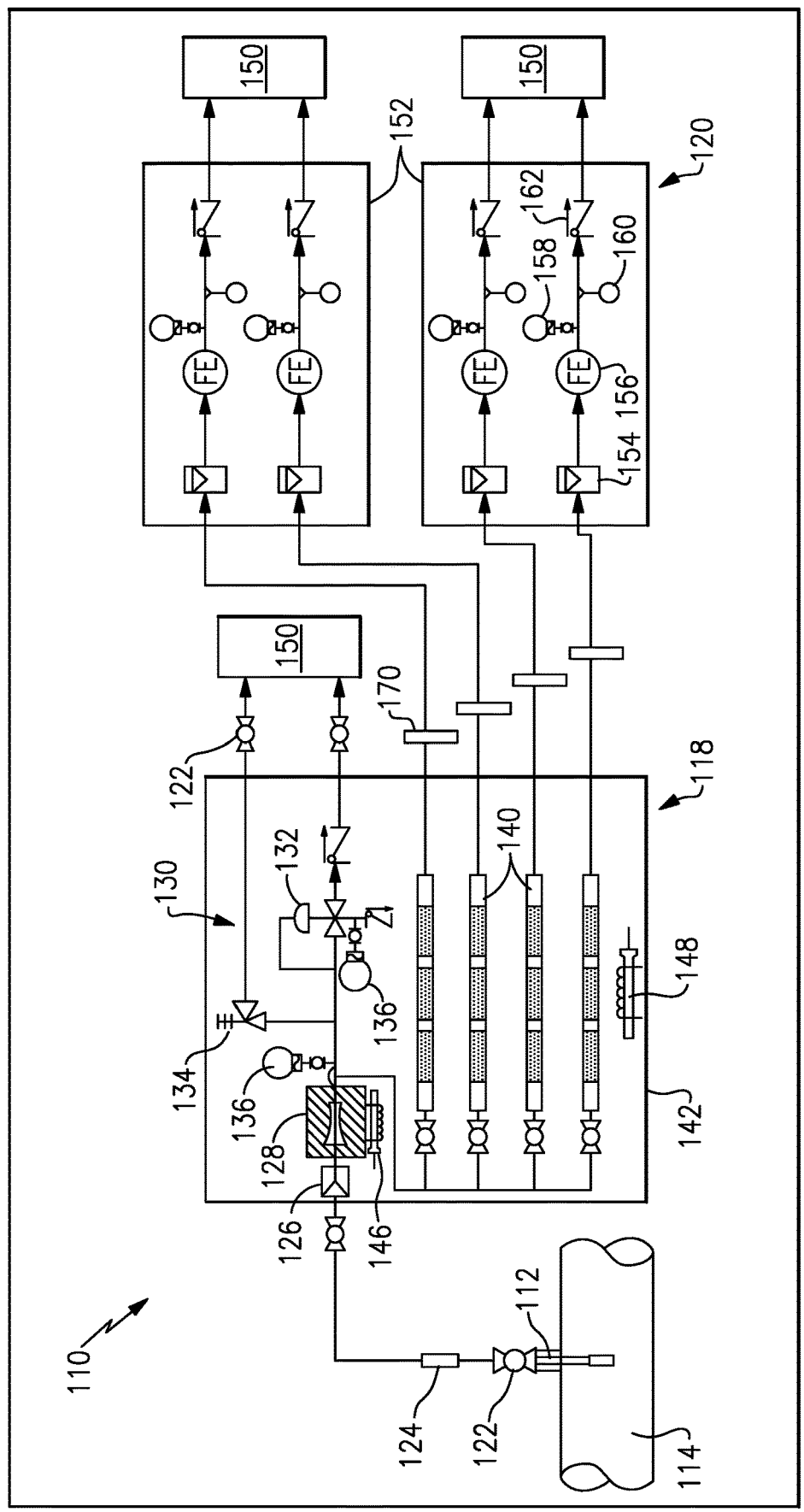
FIG. 2 schematically illustrates a second system according to this disclosure.

FIG. 2 schematically illustrates another example mercury-in-gas ("MIG") sampling system 110. In this disclosure, like reference numerals designate like elements where appropriate and reference numerals with the addition of one-hundred (i.e., a pre-appended "1") designating elements that are understood to incorporate the same features and benefits of the corresponding original elements. In this system 110, isolation valves 122 are located downstream of the pressure, flow, speed loop section 130. In this example system, there are four sorbent traps 140 in the sorbent trap section 118. However, additional or fewer sorbent traps 140 are also contemplated within the scope of this disclosure. The metering section 120 is contained within two enclosures 152. In this example system 110, the first portion of the sample stream is communicated (i.e., conveyed) to the vent header 150 without travelling through the metering section 120. In this system 110, a desiccant 170 is arranged downstream of the sorbent trap section 118. In some embodiments, the critical orifice 128 and loop section 130 are located within the sorbent trap enclosure 142. It should be understood that, with the exception of the above-discussed differences, the systems 10 and 110 are substantially similar. For example, the system 110 includes heater elements 146 and 148 that apply heat directly to the critical orifice 128 and sorbent traps 140, respectively.

It should be understood that terms such as such as "generally," "substantially," and "about" are not intended to be boundaryless terms, and should be interpreted consistent with the way one skilled in the art would interpret those terms. In addition, the various figures accompanying this disclosure are not necessarily to scale, and some features may be exaggerated or minimized to show certain details of a particular component or arrangement.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A mercury-in-gas sampling system, comprising:
    a probe configured to collect a sample gas stream;
    a pressure reduction section having a critical orifice and a heater configured to heat the critical orifice;
    a heated sorbent trap section configured to receive a first portion of the sample gas stream; and
    a control loop configured to receive a second portion of the sample gas stream, wherein the control loop comprises a back pressure regulator, a pressure check valve, a pressure gauge, and a thermometer.

2. The system as recited in claim 1, wherein the sorbent trap section is arranged in parallel to the control loop such that the first portion of the sample gas stream does not flow through the control loop.

3. The system as recited in claim 1, wherein the heater directly contacts the critical orifice.

4. The system as recited in claim 1, wherein a second heater is configured to heat the sorbent trap section.

5. The system as recited in claim 1, wherein a pressure of the sample gas stream upstream of the critical orifice is between 200 and 1500 psi, and a second pressure of the sample gas stream downstream of the critical orifice is between 5 and 10 psig.

6. The system as recited in claim 1, wherein the critical orifice contains titanium.

7. The system as recited in claim 1, wherein the heated sorbent trap section comprises a sorbent trap manifold and at least one sorbent trap in a sorbent trap enclosure.

8. The system as recited in claim 7, wherein the at least one sorbent trap includes at least one of a gold trap and a carbon trap.

9. A mercury-in-gas sampling system, comprising:
    a probe configured to collect a sample gas stream;
    a pressure reduction section having a critical orifice and a heater configured to heat the critical orifice;
    a heated sorbent trap section configured to receive a first portion of the sample gas stream;
    a control loop configured to receive a second portion of the sample gas stream; and
    wherein the metering section comprises a flow meter, a pressure gauge, and a themometer.

10. The system as recited in claim 9, wherein the metering section comprises a check valve.

11. A method for reducing pressure for a mercury-in-gas sampling system, comprising:
    collecting a sample gas stream;
    communicating the sample gas stream through a critical orifice;
    heating the critical orifice with a heater;
    communicating a first portion of the sample gas stream to a heated sorbent trap section; and
    communicating a second portion of the sample gas stream to a control loop, wherein the control loop comprises a back pressure regulator, a pressure check valve, a pressure gauge, and a thermometer, the back pressure regulator configured to control the pressure of the sample gas stream.

12. The method of claim 11, wherein the heated sorbent trap section is arranged in a parallel configuration with the control loop.

13. The method of claim 11, comprising:
    communicating the first and second portions of the sample gas stream to a metering section downstream of the heated sorbent trap section and the control loop.

14. The method of claim 11, comprising:
    maintaining a temperature of the sample gas stream above a dew point for all components in the gas stream.

* * * * *

UNITED STATES PATENT AND TRADEMARK OFFICE
CERTIFICATE OF CORRECTION

PATENT NO. : 10,712,242 B2  
APPLICATION NO. : 15/873990  
DATED : July 14, 2020  
INVENTOR(S) : Laine et al.

Page 1 of 1

It is certified that error appears in the above-identified patent and that said Letters Patent is hereby corrected as shown below:

In the Claims

In Claim 9, Column 6, Line 16; after "gas stream; and" insert --a metering section configured to communicate the sample gas stream to a vent header,--

Signed and Sealed this  
Fifteenth Day of March, 2022

Drew Hirshfeld  
*Performing the Functions and Duties of the*  
*Under Secretary of Commerce for Intellectual Property and*  
*Director of the United States Patent and Trademark Office*